Sept. 30, 1969      P. C. CULVER      3,470,524
PUSH-PULL CONNECTOR
Filed June 19, 1967      3 Sheets-Sheet 1
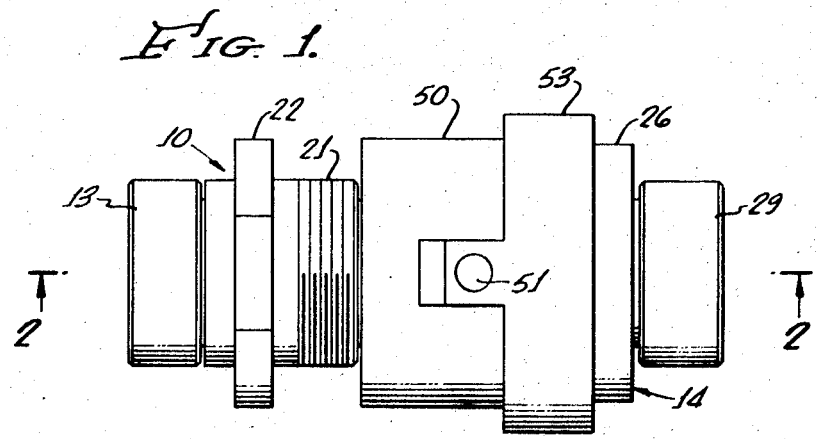
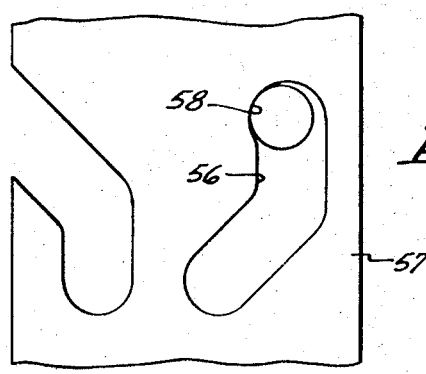
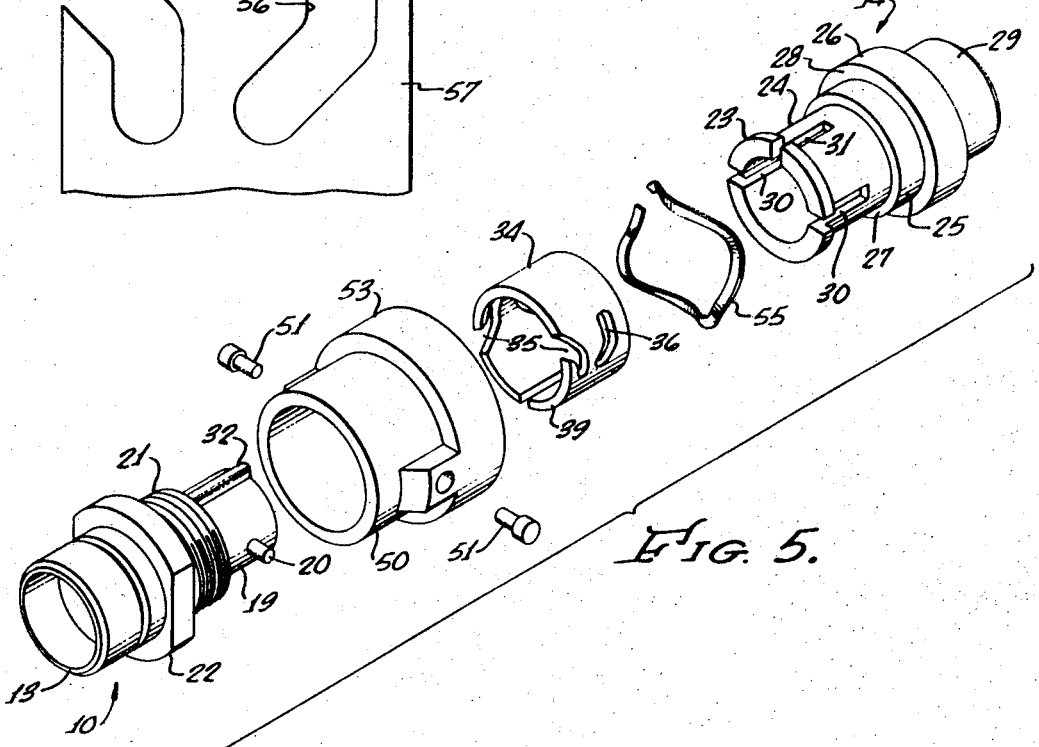
INVENTOR.
PERRIN C. CULVER
BY
ATTORNEYS.

Sept. 30, 1969     P. C. CULVER     3,470,524
PUSH-PULL CONNECTOR

Filed June 19, 1967     3 Sheets-Sheet 3

INVENTOR.
PERRIN C. CULVER

BY

ATTORNEYS.

United States Patent Office 3,470,524
Patented Sept. 30, 1969

3,470,524
PUSH-PULL CONNECTOR
Perrin C. Culver, Banning, Calif., assignor to The Deutsch Company Electronic Components Division, Banning, Calif., a corporation of California
Filed June 19, 1967, Ser. No. 646,942
Int. Cl. H01r 7/32, 13/46, 13/54
U.S. Cl. 339—90                                11 Claims

ABSTRACT OF THE DISCLOSURE

A coupling arrangement having a rotatable ring received on one part to be connected and coaxial with a collar having a pin extending into a slot into the ring, which slot has a circumferential and an angular portion. The ring includes a second slot, also having circumferential and inclined portions adapted to receiving a pin projecting from the other part to be connected. The pins act as cams during the mating and unmating of the coupling, causing the ring to rotate to hold one of the pins behind an abutment when the coupling is connected.

BACKGROUND OF THE INVENTION

*The field of the invention.*—The invention relates to couplings usable with electrical connectors and other devices.

*The prior art.*—Coupling mechanisms are used for many applications such as in the connection of fluid lines, in the construction of fasteners, and for securing together the mating parts of electrical connectors. The obvious approach has been to use a threaded sleeve or collar on one part to join complementary threads circumscribing the other section. This, of course, requires rotational movement, which takes time and may be difficult or impossible to accomplish in the available space where the coupling device may be used. Also, a threaded connection is vulnerable to vibration, so that some form of thread-locking means must be employed to combat such conditions. Other coupling arrangements have been proposed which lock the parts together in response to axial movement. Some of these have been relatively large, which imposes a severe penalty in many situations, such as when the coupling is for use in aircraft and missiles. Also, such coupling mechanisms have been somewhat complex and expensive, and their load-carrying capacity has been limited.

SUMMARY OF THE INVENTION

The present invention provides a simple axially operable coupling device resulting in a strong connection that is not sensitive to vibration or other loads imposed on the coupling. The device includes a rotatable locking ring having two kinds of slots, each of which includes an abutment portion and a portion at an angle to the axis. One of the slots is open to the edge of the locking ring and receives a projecting pin from the first of the elements to be connected at the time the coupling is actuated. The other slot is closed ended and receives a pin projecting inwardly from a spring-loaded, axially movable coupling ring carried by the other element to be connected. The coupling ring normally is held in the retracted position by the engagement of its pin with the abutment portion of the slot that receives it. It is moved out of this location by the camming action of the pin on the other mating element as it is pushed axially into the open-ended slot. The coupling ring then is shifted axially and its pin rotates the locking ring further as it slides down the inclined wall of the slot. This brings the pin of the first element into the abutment portion of its slot, which thereby locks the parts in a coupled position.

Release is accomplished by reverse movement of the coupling ring, which, through its inclined slot, causes the locking ring to rotate in the reverse direction. Then, as the pin of the first element is moved out of the open-ended slot, it engages the inclined wall to complete the rotation of the locking ring back to the original position, where it holds the coupling ring in its retracted position.

An object of this invention is to provide an improved axially operated coupling mechanism.

A further object of this invention is to provide a coupling arrangement that provides a strong retaining force and is resistant to vibrational and other loads.

Another object of this invention is to provide a coupling arrangement of simple and reliable construction, and which may be cycled many times without failure.

An additional object of this invention is to provide a coupling arrangement that is simple to operate, light in weight and occupies a small volume.

These and other objects will become apparent from the following detailed description taken in connection with the accompanying drawing.

BRIEF DESCRIPTION OF THE DRAWING

FIGURE 1 is a side elevational view of the coupling of this invention as applied to an electrical connector, with the parts in the coupled position;

FIGURE 5 is an exploded perspective view of the operative components of the coupling mechanism;

FIGURE 9 is a fragmentary elevational view of a locking ring having a slot of modified configuration.

DESCRIPTION OF THE PREFERRED EMBODIMENTS

Figure 2:
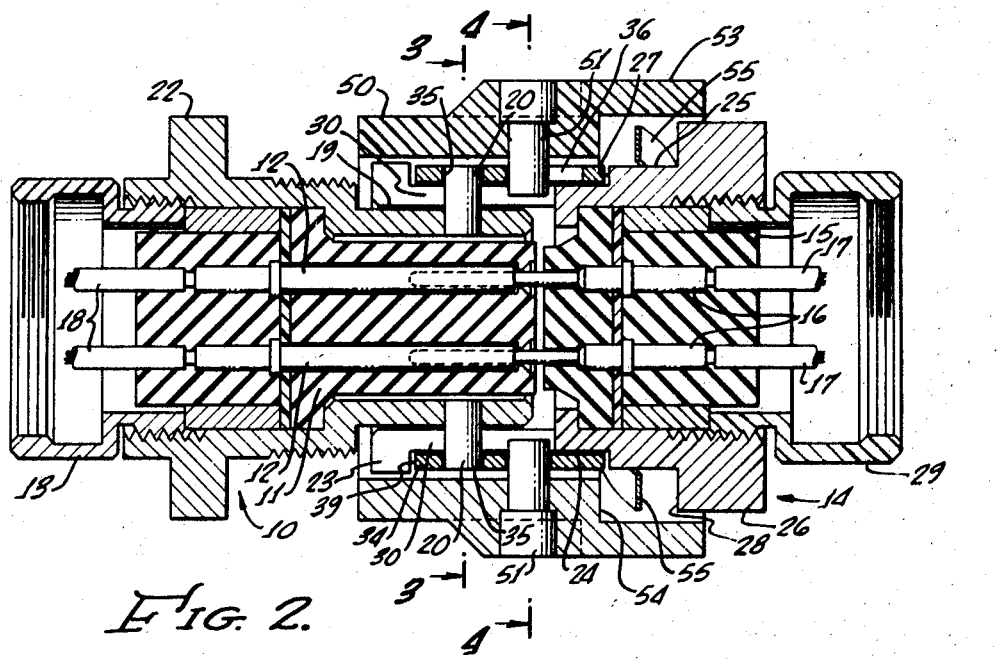
FIGURE 2 is a longitudinal sectional view taken along line 2—2 of FIGURE 1.
Figures 3, 4:
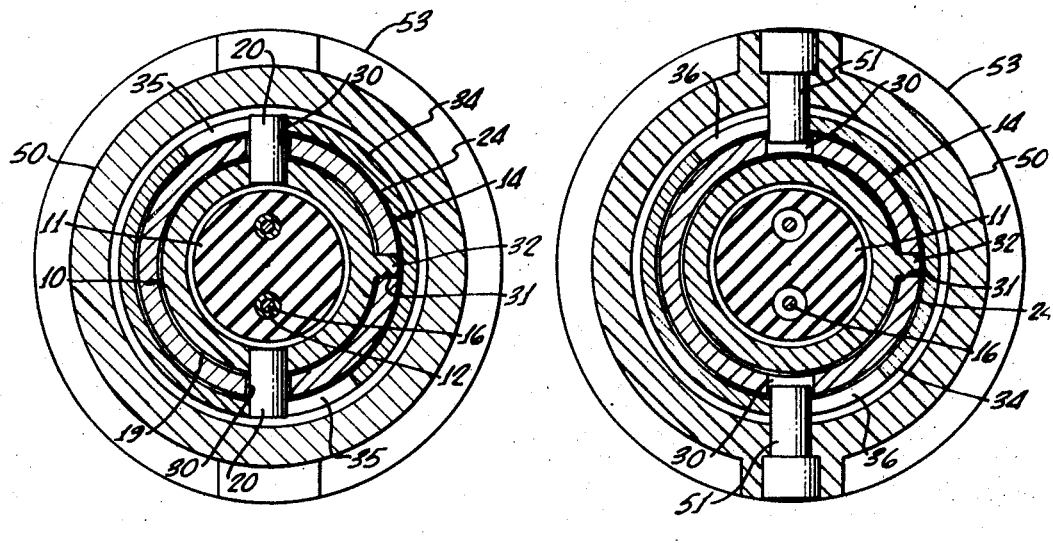
FIGURE 3 is a transverse sectional view taken along line 3—3 of FIGURE 2.
FIGURE 4 is a transverse sectional view taken along line 4—4 of FIGURE 2.

While the coupling arrangement of this invention is of general utility and may be employed in connecting fluid lines or for other uses, it is illustrated in the drawing in conjunction with a multiple pin-and-socket type electrical connector. These connectors include a plurality of pin contacts in one section of the connector which enters corresponding openings in socket contacts in the other mating portion when the connector is assembled. The coupling arrangement of this invention is used in holding the two connector sections in the assembled relationship.

The connector includes a flanged tubular receptacle 10, which is the stationary portion of the connector, and carries an insert 11 of dielectric material having openings through it in which are positioned socket contacts 12. A retaining nut 13 threads into the end of the receptacle shell 10 at the rearward end of the insert 11.

A plug shell 14 also is tubular and carries an insert 15 of dielectric material within the openings of which are pin contacts 16. It is equally possible to mount the socket contacts in the plug and the pin contacts in the receptacle. When the pins 16 enter the sockets 12, electrical circuits are completed between the wires 17 and 18 connected to the mating contacts.

The forward end 19 of the receptacle shell is of reduced diameter and carries a pair of radially outwardly projecting bayonet pins 20. Inwardly of the end portion 19 is a larger exteriorly threaded section 21 adapted to be connected in a threaded opening in a panel or other supporting element. A flange 22 adjacent the threaded portion 21 positions the receptacle shell when it is connected to the support.

The plug shell 14 includes a radially outwardly projecting flange 23 beyond which is a straight cylindrical section 24 of reduced diameter. The portion 25 adjacent the section 24 is of larger diameter, and beyond this is a still larger section 26. This provides a radially outwardly extending shoulder 27 between the portions 24 and 25, and a similar type of shoulder 28 between the sections 25 and 26. The retaining nut 29 threads into the rearward end of the section 26.

Opposed longitudinally extending slots 30 extend into the forward end of the plug shell 14 through the flange 23 and the section 24. These are adapted to receive the outwardly projecting bayonet pins 20 when the connector is mated. A third longitudinal slot 31 also extends into the forward end of the plug shell 14. A key 32 on the forward end portion 19 of the receptacle fits in the slot 31 when the coupling segments are joined together. The key 32 and keyway 31 polarize the connector, so that the proper pin and socket contacts 16 and 12 mate when the connector is secured by permitting the parts to be joined in only one rotational position.

Circumscribing the cylindrical portion 24 of the plug shell is a split locking ring 34. This annular member is prevented from axial movement relative to the plug shell by the shoulder 27 and the flange 23 of the plug shell. The locking ring includes two sets of opposed slots 35 and 36 through its cylindrical wall. Each slot includes a circumferential portion connecting to a section that extends from it at an obtuse angle. Hence, each of the slots has somewhat the shape of a boomerang.

Each slot 35 is open at one end, including an inclined entrance portion defined by parallel walls 37 and 38 which extend to the forward edge 39 of the locking ring 34. The entrance portion leads to the circumferential portion of the slot 35, which is bounded by walls 40 and 41 extending to a closed end 42.

Both ends 43 and 44 of the slots 36 are closed. The end 43 is adjacent the circumferentially extending side edges 45 and 46, which connect to parallel inclined side walls 47 and 48 of the slots 36. The walls 47 and 48 incline in the opposite direction from the walls 37 and 38 at the entrance to the slots 35.

A coupling ring 50 provides a collar that circumscribes the plug shell 14 around the locking ring 34 and is longitudinally slidable relative to the plug shell and locking ring. A pair of opposed bayonet pins 51 is carried by the coupling ring 50. The pins 51 extend inwardly into the slots 36 in the locking ring 34. The inner ends of the pins 51 also project into the opposed slots 30 of the plug shell 14. This prevents rotation of the coupling ring 50 relative to the plug shell 14.

The rearward portion 53 of the coupling ring 50 is enlarged, and at its end extends over the section 26 of the plug shell. The section 53 also extends forwardly around the smaller portion 25 of the plug shell. A radial shoulder 54 is provided where the enlargement in diameter takes place. The result is an annular space bounded by the shoulders 28 and 54 and the circumferential surfaces of the portions 25 and 53 of the plug shell and coupling ring. Within this space is an undulant spring 55 that bears against the shoulders 28 and 54. Consequently, the spring 55 biases the coupling ring 50 forwardly, or to the left as the device is illustrated.

Figure 6:
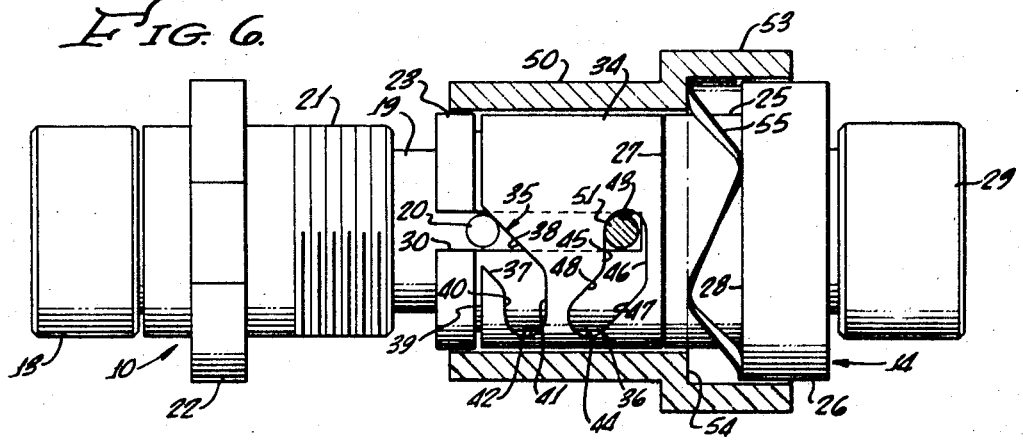
FIGURE 6 is a side elevational view of the connector, partially broken away, illustrating the parts as the mating of the coupling is commenced.

When the coupling is unmated, the pin 51 is brought into engagement with the wall 45 of the locking ring 34 by the force of the spring 55, as illustrated in FIGURE 6. This edge forms an abutment that limits the forward movement of the coupling ring 50, so that the coupling ring is held in a retracted position on the plug shell 14.

In mating the connector, the plug and receptacle are moved axially relative to each other, bringing the pin contacts 16 into the socket contacts 12. Also, this movement causes the bayonet pins 20 of the receptacle to enter the opposed slots 30 in the plug shell. The pins 20 are of a length such that their ends project beyond the surface of the plug shell section 24. Therefore, as the plug is moved toward the receptacle, the pins 20 are brought to bear against the side edges 38 of the slots 35 in the lock ring 34, which position is shown in FIGURE 6. Further axial advancement of the plug relative to the receptacle causes the pins 20 to exert a force against the edges 38 of the slots 35. Because of the inclination of the walls 38 relative to the axis of the connector, this movement displaces the locking ring 34 laterally, causing it to rotate. In other words, the pins 20 act as cams that deflect the locking ring so that it is rotated about the section 24 of the plug shell 14. The plug and receptacle cannot rotate relative to each other because of the pins 20 in the straight slots 30, as well as the presence of the key 32 in the keyway 31.

Figure 7:
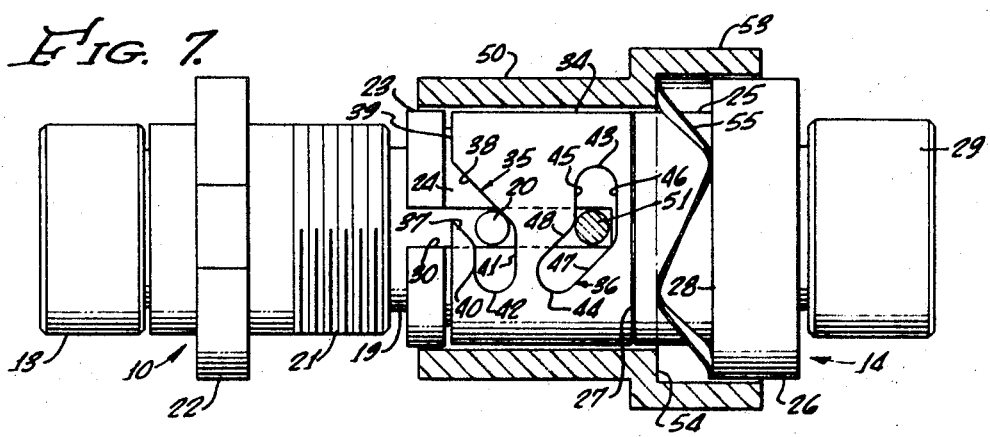
FIGURE 7 is a view similar to FIGURE 6, with the parts in an intermediate position.

The axial movement of the plug relative to the receptacle shifts the bayonet pins 20 into the slots 35 in the plug shell until the pins 20 are brought to the entrances to the circumferential portions of the slots 35, as seen in FIGURE 7. The pins 20 then can produce no more angular movement of the locking ring 34 because they have reached the ends of the inclined edges 38. At this point, however, the locking ring has been rotated to where the ends of the edges 45 of the slots 36 have been moved just past the pins 51. Consequently, the coupling ring 50 no longer is prevented from forward movement by the reaction between the pins 51 and the edges 45. Therefore, the spring 55 pushes the coupling ring 50 forwardly, or to the left as the device is shown.

Figure 8:
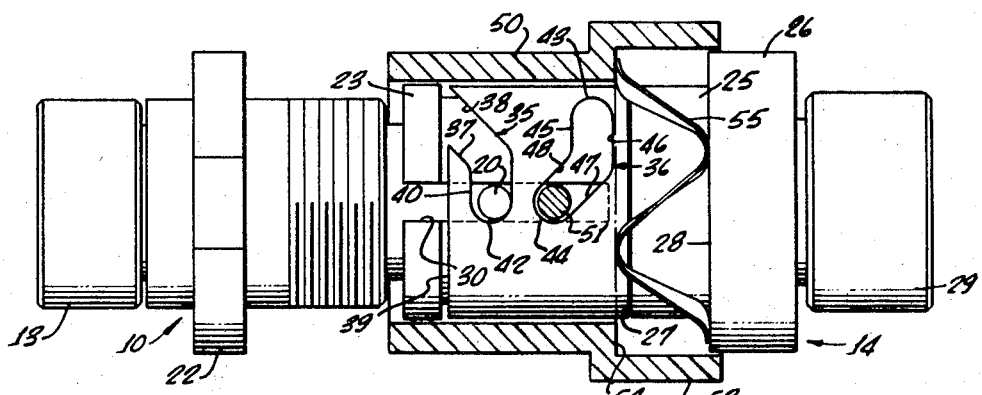
FIGURE 8 is a view similar to FIGURES 6 and 7, but with the parts fully coupled.

As this movement of the coupling ring 50 takes place, the pins 51 exert a force on the locking ring 34 along the edges 48 of the slots 36. Because the edges 48 are inclined relative to the axis of the connector, a side reaction is produced on the locking ring 34. This shifts the locking ring 34 laterally to rotate it relative to the plug shell 14. At this time, therefore, the pins 51 serve as cams, reacting against the edges 48 to cause the angular movement of the locking ring 34. With the edges 48 being inclined oppositely from edges 38, and the coupling ring 50 moving in a direction opposite from that of the bayonet pins 20, the rotational movement of the locking ring is the same as previously given to it by the bayonet pins 20. Therefore, the locking ring 34 continues to turn, and the parts reach the position of FIGURE 8. This rotation of the locking ring 34 brings the bayonet pins 20 into the circumferential portions of the grooves 35 and to a location adjacent the ends 42 of these slots. As a result, the connector is held in the mated position. This is because the edges 40 of the slots 35 provide abutments that prevent the plug from being withdrawn from the receptacle by holding against the pins 20. At the same time, the spring 55 maintains the coupling ring 50 in its forward position, so that the pins 20 are locked in the circumferential portions of the slots 35.

A strong retaining force is provided by the solid wall of the locking ring adjacent the edge 40, backed up by the flange 23 of the plug shell. The coupling is not sensitive to vibrational forces or other loads imposed on the coupling mechanism, but will be retained in place as long as desired. At the same time, the mating of the connector is particularly simple, requiring only the relative axial movement of the plug and receptacle to cause the coupling to become locked in position.

Release of the coupling is accomplished by moving the coupling ring 50 in the opposite direction, or to the right as the device is shown. When the coupling ring is shifted rearwardly relative to the plug shell 14, the pins 51 engage the inclined edges 47 of the slots 36. This causes the locking ring 34 to rotate in the direction opposite from that in which it turned while coupling the parts. This movement of the locking ring continues until the pins 51 are brought substantially to the intersection of the edges 45 and 48 of the slots 36. The resulting amount of rotation of the locking ring 34 shifts the locking ring to a position where the bayonet pins 20 are moved just past the intersection of the edges 37 and 40 of the slots 35. This permits the plug and receptacle to be separated axially.

As the plug is pulled away from the receptacle, the pins 20 strike the inclined edges 37 of the recesses 35, thereby causing further rotation of the locking ring 34. This last increment of rotation brings the edges 45 of the recesses 36 adjacent the pins 51, so that the coupling ring 50 is held in its retracted position. Thus, despite the secure holding effect obtained by the coupling arrangement, its release is accomplished by a simple axial shifting of the coupling ring followed by the separation of the two components of the connector.

The slots for the bayonet pins need not have portions extending precisely circumferentially so long as they present edges which serve as abutments at appropriate times. For example, the slot 56 in the locking ring 57 of FIGURE 9 is provided with a circular enlarged portion 58 rather than a straight circumferential edge as in the previously described embodiment. As before, however, the edge of the slot prevents the coupling ring 50 from moving forwardy while the connector sections are separated. The circular enlargement 58 provides a recessed seat that helps to position and retain the pin 51 against inadvertent movement in the slot 56.

The foregoing detailed description is to be clearly understood as given by way of illustration and example only.

I claim:
1. A coupling device comprising
a first member,
a second member,
   said first and second members being relatively movable toward and away from each other between a position where said first and second members are relatively adjacent and a position in which said first and second members are relatively remote,
a third member connected to said second member and movable laterally relative thereto along a predetermined path,
a fourth member movable relative to said second member in a direction generally transverse to said predetermined path,
a first cam means on said first member, and a second cam means on said fourth member,
   said third member having
      a first surface engaged by said second cam means when said first and second members are in said relatively remote position for preventing said movement of said fourth member relative to said second member,
      a second surface engaged by said first cam means upon said relative movement of said first and second members toward each other,
         said second surface being inclined relative to said predetermined path and said direction to produce a lateral reaction on said third member for causing said lateral movement of said third member upon said engagement of said second surface by said first cam means and said relative movement of said first and second members toward each other,
      said first surface being shifted away from said second cam means upon said lateral movement of said third member, whereby said fourth member is not so prevented from movement by said first surface and is movable relative to said second member in said direction,
      a third surface shifted to a position of engagement with said second cam means upon said movement of said fourth member,
         said third surface being inclined relative to said predetermined path and said direction to produce a lateral reaction on said third member for causing additional lateral movement of said third member upon said engagement of said third surface and said second cam means and said movement of said fourth member in said direction,
      and a fourth surface shifted to a position adjacent said first cam means upon said additional lateral movement of said third member for preventing movement of said first member away from said third and second members.

2. A device as recited in claim 1 in which said third member comprises an annular element rotatable relative to said second member, said second member including means for preventing substantial axial movement of said annular element relative thereto, said surfaces of said annular element being provided by slot means therein.

3. A device as recited in claim 2 in which said fourth member comprises a collar on said second member, said collar being axially slidable relative to said second member, and including means for preventing substantial rotation of said collar relative to said second member.

4. A device for coupling a first member to a second member comprising
a laterally movable lock member on said second member,
   said lock member having a first and a second slot therein,
      each slot having an inclined surface and an abutment surface,
and a slidable member on said second member,
   said slidable member having a projection received in said second slot normally adjacent said abutment surface thereof,
   said first member having a projection thereon adapted for entry into said first slot,
   said projection of said first member being engageable with said inclined surface of said first slot upon entry of said projection into said first slot and movement of said first member relatively toward said second member for thereby providing a reaction resulting in lateral movement of said lock member,
   said lock member being thereby moved to where said projection on said slidable member is away from said abutment surface of said second slot and in a position of adjacency with said inclined surface of said second slot,
   said slidable member being thereby movable relative to said second member for causing said projection of said slidable member to react against said inclined surface of said second slot for accomplishing further lateral movement of said lock member,
   said lock member being thereby moved to where said projection of said first member is positioned adjacent said abutment of said first slot for thereby holding said first and second members together.

5. In combination with a first member and a second member movable between a position in which said first and second members are relatively adjacent and a position in which said first and second members are relatively remote, a device for coupling said first member to said second member comprising an annular member circumscribing said second member and rotatable relative thereto, means on said second member for preventing substantial axial movement of said annular member relative to said second member, said annular member having a duality of slots therein, each of said slots having an abutment surface and an inclined portion having an edge, the first of said slots having an open end adjacent said inclined portion thereof, a collar coaxial with said annular member, said collar having a projection in the second of said slots normally in engagement with said abutment surface of said second slot when said first and second members are in said relatively remote position, said first member including a projection adapted to enter said first slot upon axial movement of said first member relatively toward said second member, said projection of said first member reacting against said edge of said inclined portion of said first slot for causing rotation of said annular member in one direction upon said entry and relative axial movement, said abutment surface of said second slot being moved to a position remote from said projection of said collar upon said rotation of said annular member, said collar being thereby movable axially relative to said second member for causing said projection of said collar to react against said edge of said inclined portion of said second slots for causing additional rotation of said annular member in said one direction, said abutment surface of said first slot being moved to a position of adjacency with said projection of said first member upon said additional rotation of said annular member, whereby said projection of said first member and said annular member hold said first and second members together.

6. A coupling device comprising a first member, a second member, an annular member circumscribing said second member and being rotatable relative thereto, abutment means for precluding substantial axial movement of said annular member relative to said second member, said annular member having a duality of slots therein, each of said slots including an inclined portion having opposed edges and a portion having an abutment surface, said inclined portions being inclined in opposite directions, the first of said slots having an open end at an edge of said annular member providing entrance to said inclined portion of said first slot, a collar circumscribing said annular member, said collar being axially movable relative to said second member, means for precluding substantial rotation of said collar relative to said second member, a first projecting element extending inwardly from said collar and received in the second of said slots adjacent said abutment surface of said second slot when said collar is in one axial position relative to said second member whereby said adjacent abutment surface and said first projecting element hold said collar in said one axial position, a second projecting element extending outwardly from said first member and receivable in said first slot upon rectilinear movement of said first member relatively toward said second member whereby said second projecting element engages one of said opposed edges of said inclined portion of said first slot for causing rotation of said annular member in one rotational direction, said second slot being thereby moved so that said first projecting element is remote from said abutment surface thereof and is adjacent said inclined portion of said second slot, said collar being thereby movable in one axial direction relative to said second member to a second axial position, thereby causing said first projecting element to engage one of said opposed edges of the inclined portion of said second slot for imparting further rotation in said one rotational direction to said annular member, said abutment surface of said first slot being thereby brought into adjacency with said second projecting element for holding said first member to said annular member and said second member, and resilient means biasing said collar toward said second axial position, said collar being movable in the opposite axial direction in opposition to said resilient means for causing said first and second projecting elements to engage the other ones of said opposed edges of said inclined portions of said first and second slots for rotating said annular member in the opposite rotational direction for releasing said first and second members.

7. A device as recited in claim 6 in which said first member and said collar have opposed spaced shoulders intermediate which is an annular space, and including an undulant spring in said annular space engaging said shoulders for thereby providing said resilient means biasing said collar to said second position.

8. A device as recited in claim 6 including a key and keyway means on said first and second members interengageable upon said relative movement of said first member toward said second member for precluding substantial relative rotation of said first and second members.

9. A device as recited in claim 6 in which for said means for precluding rotation of said collar relative to said second member said second member includes longitudinally extending slot means, and said first projecting element includes a portion extending beyond said second slot and received within said longitudinally extending slot means, whereby said longitudinally extending slot means guides said portion of said first projecting element and so prevents said relative rotation of said collar and said second member.

10. An electrical connector comprising a first member, a second member, said first and second members being movable relative to each other between a position in which said first and second members are relatively remote and a position in which said first and second members are relatively adjacent, contact means in said first member, contact means in said second member, said contact means being interengageable upon relative rectilinear movement of said first and second members toward each other, said second member having a tubular portion, said first member having a portion adapted to enter said tubular portion upon said relative movement of said members toward each other,
said tubular portion having a longitudinal slot therein,
said first member having an outwardly projecting pin adapted to enter said slot upon said movement of said first and second members toward each other,
said pin having a portion extending beyond said tubular portion,
an annular member rotatably circumscribing said tubular portion,
means for preventing substantial axial movement of said annular member relative to said second member,
said annular member having a first slot,
said first slot having an inclined entrance portion adapted to receive said extending portion of said pin upon said relative movement of said first and second members,
said inclined entrance portion having opposed sidewalls one of which is engageable by said extending portion of said pin upon said relative movement of said first and second members,
said pin thereby providing a lateral reaction on said annular member for causing rotation of said annular member relative to said second member,
said annular member having a second slot,
and a collar circumscribing said annular member and linearly movable relative thereto,
said collar having a pin extending into said second slot,
said second slot having an abutment surface normally engaging said pin of said collar when said first and second members are in said relatively remote position for preventing said linear movement of said collar relative to said second member,
said abutment surface being moved to a position remote from said pin of said collar when said annular member is so moved by said pin of said first member,
said second slot having an inclined portion receiving said pin of said collar upon said movement of said annular member,
whereby said collar is movable linearly relative to said second member and produces a reaction on said annular member in said inclined portion of said second slot for producing further rotation of said annular member,
said first slot having an abutment surface brought to a position of adjacency with said pin of said first member upon said further rotation of said annular member for thereby preventing withdrawal of said first member from said second member.

11. A coupling device comprising
a first member,
a second member,
said first and second members being movable relative to each other between a position in which said first and second members are relatively remote and a position in which said first and second members are relatively adjacent,
an annular member circumscribing said second member adjacent one end thereof,
said annular member being rotatable relative to said second member,
means for preventing substantial axial movement of said annular member relative to said second member,
said annular member having a first slot and a second slot therein,
said first slot having an open end adjacent one end of said annular member and a pair of opposed inclined side walls extending inwardly from said open end,
said first slot having an abutment surface laterally displaced from said inclined walls,
said second slot having a lateral abutment surface adjacent the opposite end of said annular member and opposed inclined walls extending to an end of said second slot relatively adjacent said one end of said annular member,
said inclined walls of said second slot being inclined in a direction opposite from the inclination of said inclined walls of said first slot,
a collar circumscribing said annular member,
said collar being axially slidable relative to said second member,
means for preventing rotation of said collar relative to said second member,
a first pin means projecting from said first member, and a second pin means projecting inwardly from said collar into said second slot,
said second pin means being normally adjacent said abutment surface of said second slot when said first and second members are in said relatively remote position for thereby holding said collar from movement toward said one end of said second member, said first pin means being adapted to enter said first slot through said open end thereof for reacting against one of said inclined walls of said first slot for producing rotational movement of said annular member upon linear advancement of said first member toward said second member,
said abutment surface of said second slot being thereby moved away from said second pin means,
whereby said collar is movable toward said one end of said second member for causing said second pin means to react against one of said inclined surfaces of said second slot for thereby causing additional rotation of said annular member in the same direction for bringing said abutment surface of said first slot into a position of adjacency with said first pin means for precluding withdrawal of said first member from said second member,
said second pin means being engageable with the other of said inclined surfaces of said second slot and said first pin means being engageable with the other of said inclined surfaces of said first slot upon subsequent movement of said collar toward the opposite end of said second member and withdrawal of said first member from said second member for release of said coupling.

References Cited
UNITED STATES PATENTS

| | | | |
|---|---|---|---|
| 1,871,370 | 8/1932 | Jacques | 285—361 |
| 2,076,918 | 4/1937 | Robison | 285—178 |
| 2,409,650 | 10/1946 | Wiggins | 285—173 |
| 3,097,001 | 7/1963 | Le Bus | 285—361 |
| 3,201,151 | 8/1965 | Westveer | 285—73 |
| 3,217,373 | 11/1965 | Bohlin | 24—239 |

MARVIN A. CHAMPION, Primary Examiner
JOSEPH H. McGLYNN, Assistant Examiner

U.S. Cl. X.R.
24—230; 285—361, 362; 287—103; 339—186